United States Patent
Goetz et al.

(10) Patent No.: US 10,409,559 B2
(45) Date of Patent: Sep. 10, 2019

(54) SINGLE-SOURCE-BASE COMPILATION FOR MULTIPLE TARGET ENVIRONMENTS

(71) Applicant: Oracle International Corporation, Redwood City, CA (US)

(72) Inventors: Brian Goetz, Williston, VT (US); Maurizio Cimadamore, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/074,208

(22) Filed: Mar. 18, 2016

(65) Prior Publication Data
US 2017/0269907 A1    Sep. 21, 2017

(51) Int. Cl.
*G06F 9/44*    (2018.01)
*G06F 8/30*    (2018.01)
*G06F 8/41*    (2018.01)

(52) U.S. Cl.
CPC . *G06F 8/30* (2013.01); *G06F 8/41* (2013.01)

(58) Field of Classification Search
CPC .................. G06F 9/44536; G06F 9/45516
See application file for complete search history.

(56) References Cited

U.S. PATENT DOCUMENTS

| | | | | |
|---|---|---|---|---|
| 5,724,590 A * | 3/1998 | Goettelmann | ............ | G06F 8/52 711/E12.014 |
| 6,526,570 B1 * | 2/2003 | Click, Jr. | .................. | G06F 8/76 717/140 |
| 8,224,493 B2 * | 7/2012 | Walker | .................... | A01G 25/16 700/284 |
| 9,052,966 B1 * | 6/2015 | Quinlan | ..................... | G06F 8/51 |
| 9,977,673 B1 * | 5/2018 | Friedkin | ................... | G06F 8/76 |
| 2009/0037898 A1 * | 2/2009 | Belisario | .................... | G06F 8/20 717/169 |
| 2009/0113402 A1 * | 4/2009 | Chen | ......................... | G06F 8/41 717/140 |
| 2011/0276954 A1 | 11/2011 | Fontenot | | |
| 2012/0185450 A1 * | 7/2012 | Marmigere | ........... | G06F 9/4488 707/695 |
| 2013/0174133 A1 | 7/2013 | Goetz | | |
| 2014/0282372 A1 * | 9/2014 | Araya | ..................... | G06F 8/447 717/106 |
| 2014/0282439 A1 * | 9/2014 | Kannan | ..................... | G06F 8/76 717/140 |
| 2014/0304687 A1 | 10/2014 | Hobbs | | |
| 2015/0135170 A1 * | 5/2015 | Murray | ............... | G06F 9/45516 717/148 |
| 2016/0062765 A1 | 3/2016 | Ji | | |

OTHER PUBLICATIONS

"How to modify code before compilation?", Stack Overflow, https://stackoverflow.com/questions/33316049/how-to-modify-code-before-compilation, 5 pages. [Retrieved Nov. 5, 2018].

* cited by examiner

*Primary Examiner* — Duy Khuong T Nguyen
(74) *Attorney, Agent, or Firm* — Meyertons, Hood, Kivlin, Kowert & Goetzel, P.C.

(57) ABSTRACT

A method for software compilation is disclosed. A compiler may identify features of source code which are unavailable in a target environment for the compilation. The compiler may then translate the identified features into modified features in response to determining that projections for the identified features into the target environment are available. The compiler may then compile the source code dependent upon the modified features.

10 Claims, 5 Drawing Sheets

SINGLE-SOURCE-BASE COMPILATION FOR MULTIPLE TARGET ENVIRONMENTS

BACKGROUND

Technical Field

This disclosure relates to software compilation and more specifically to compilation into a target environment.

Description of the Related Art

Modern computing systems may include multiple processors or processor cores configured to execute software programs or applications. The programs and applications may allow the processors or processor cores to perform a variety of tasks. For example, when executing a web browser program, a processor may perform operations such as requesting data from a server via a network connect, and displaying the request data to a screen or other suitable display device. Such program and applications may initially be stored in long-term storage, such as, hard disc drives, CD ROMs, and then transferred to memory for retrieval by a processor or processor core for execution.

Such programs and applications may be written in a high-level programming language, such as, e.g., Java™, C, C++, and the like. In order to allow a computing system to execute the program or application, it must be converted into a format compatible with the computing system. This conversion is commonly referred to as "compilation." During compilation, the high-level programming language is converted into binary data (commonly referred to as "binaries" or "machine code") which includes commands that are part of the Instruction Set Architecture or "ISA" of the computing system.

During compilation, the compiler may perform syntax, lexical, and semantic checks, and generate warning or error messages in response to errors found during the checks. After the checks have been completed, the compiler may perform optimization which may include the discovery and propagation of constant values, removal of useless or unreachable code, and the like. Once any optimization has been completed, the complier may then generate machine code executable by a processor or processor core.

SUMMARY OF THE EMBODIMENTS

Various embodiments of a method for compilation into a target environment are disclosed. Broadly speaking, a method is disclosed in which program instructions are stored in a non-transitory computer-accessible storage medium that, when executed by a computer system, cause the computer system to perform operations including receiving source code for a program and identifying a portion of the source code using a first feature that is unavailable in the target environment. The operations may also include translating the portion of the source code to generate a modified version of the portion of the source code in response to determining that a projection of the first feature into the target environment is available, and compiling the source code for the program dependent upon the modified version of the portion of the source code.

In another embodiment, the source code includes source code for one or more software libraries. In a further embodiment, the source code is written in a first version of a programming language. The target environment specifies a second version of the programming language, which is a prior version of the programming language than the first version.

In a non-limiting embodiment, translating the portion of the source code includes replacing a first source construct included in the source code with a second source construct. The second construct may use a second feature available in the target environment.

Figure 1:
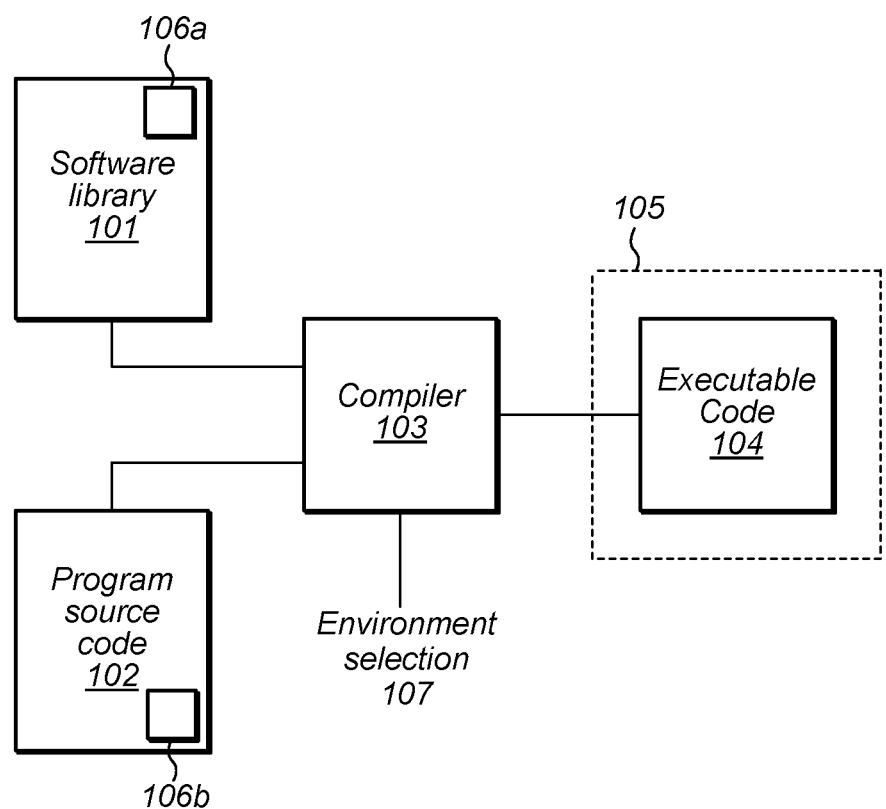
FIG. 1 is a functional diagram of an embodiment of software compilation.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Programmers face a wide array of different environments when writing software. In addition to different hardware platforms, and different operating system versions, programming languages themselves may have different versions, some of which may include features unavailable in other versions. Additionally, some features may be enhanced from one version of the programming language to another to improve performance. Moreover, software libraries that contain pre-written functions, data types, and the like, that programmers may employ when writing software may also have different versions.

In some cases, programmers maintain separate source code for each target environment they wish to support. For example, a programmer may maintain two different source code files for two different versions of the programming platform. Maintaining separate versions of source code may be costly and prone to error. This problem may be of particular concern for software library developers who must maintain a version of the library for older versions of the programming platform while a new version of the programming platform is adopted.

Rather than maintain multiple versions of source code, a compiled library or compiled output created by the compilation of program source code may be translated into the target environment. Such conversions, however, may present problems. Compilation is a lossy process. For example, type information is lost during compilation. In converting a compiled program, further information is lost, making debug of the original source code difficult. The embodiments illustrated in the drawings and described below may provide techniques for compiling program source code and associated libraries for a target environments while eliminating the need for multiple source code versions and improving debug by preserving more information during compilation.

A functional diagram depicting software program compilation is illustrated in FIG. 1. The illustrated embodiment includes software library 101 and program source code 102. Program source code 102 and software library 101 may be written in a high-level programming language such as, Java™, for example. Moreover, program source code 102 may include a reference to one or more functions, sub-routines, or other data included in software library 101. Program source code 102 may include portions of code, which use feature 106b, and software library 101 may include portions of code that use feature 106a. In various embodiments, features 106a-b may be compatible with a particular environment in which the compiled code is to be executed, such as, environment 105, for example.

Compiler 103 may receive program source code 102 and software library 101, and generate executable code 104. In various embodiments, executable code 104 may be targeted for a specific environment, such as, environment 105, for example. Environment 105 may include, in some embodiments, a particular hardware configuration, a particular versions of an operating system, a particular version of the programming language, or any suitable combination thereof. Compiler 103 may in some embodiments, infer the target environment. For example, compiler 103 may test available runtime libraries to check for specific patterns that belong to a particular environment. Once all such constraints are determined, compiler 103 may select a least one of available environments that satisfy the accumulated constraints.

In various embodiments, a user may select the target environment for compiler 103 via environment selection 107. Such a selection may be performed using a command line option, or other suitable method for providing compiler 103 with additional information specifying a particular environment. For example, as illustrated in Example 1, the target environment is a specific version of the Java programming language, and a Java compiler is instructed to compile the source code file Foo.java using version 1.8 of Java using the flag "-source 1.8".

Example 1

Java Compilation to a Specific Programming Language Version javac -source 1.8 Foo.java In some cases, compiler 103 may infer a particular source environment compatible with program source code 102 and software library 101. As used and described herein, a source environment is an environment that is compatible with all features referenced in a particular collection of program and software library source code. For example, compiler 103 may scan program source code 102 and software library 101 checking for portions of code that use particular features. As the uses of particular features are encountered, constraints are added corresponding to versions of the source environment in which particular features are available. Once program source code 102 and software library 101 have been analyzed, a particular source environment may be selected that satisfies the accumulated constraints. In other embodiments, the source environment may be specified by a user through the use of command line flags, such as are illustrated in Example 1.

As mentioned above, some features used by portions of source code in either of program source code 102 or software library 101 may not be compatible with a particular environment. For example, as hardware of a computing system evolves, a particular feature in program source code or software library may be altered to take advantage of increased functionality. Such alterations may allow for better performance when the compiled program is executed in the target environment.

An example of how a feature may be enhanced from one environment to another is illustrated in Example 2. As depicted in Example 2, Java generics are constrained to be reference-only in Java 8, while in Java 10 the generics are allowed to have an expanded domain. It is noted that while the following examples are generally directed towards the Java programming language, in other embodiments, any suitable programming language may be employed.

Example 2

Enhanced Generics from Java 8 to Java 10

```
Java 8:
    Class Box<T> {
        T element;
    }
Java 10:
    Class Box<any T> {
        T element;
    }
```

If code to be compiled has been written to include the enhanced features of Java 10, but is to be compiled in a Java 8 environment, the enhanced features are not available and would result in a compilation error when compiled in a Java 8 environment. This poses a particular problem for providers of software libraries, such as software library 101, for example.

Library providers generally want their library to be usable by a broad range of users. This may include users of multiple environments, such as, e.g., Java 8 and Java 10. In order to allow for users of multiple environments, library providers may have to generate and maintain different libraries for each environment. Maintaining multiple libraries may increase costs and be prone to error.

In many cases, however, a projection from one environment to another may exist. As used and described herein, a projection is a mechanical translation of source code. In some embodiments, the mechanical translation may be semantic preserving, while, in other embodiments, the mechanical translation may not be semantic preserving (commonly referred to as being "lossy"). The projection may provide a method to translate the enhanced feature of one environment to a suitable feature of another environment. For example, in reference to Example 2, a possible projection from Java 10 to Java 8 may be to convert Class Box<any T> to Class Box<T> by removing the "any."

When a projection is available from one environment to another, library source files may be written to use the enhanced features of a particular environment, and the files may then be modified by a compiler, such as, e.g., compiler 103, to apply any projections from the source file as written to the target environment. For example, a user may instruct a compiler to compile source code including Java 10 features to down convert the source code to source code compatible with a Java 8 environment. In various embodiments, the user may employ a "-projectSource 8" option on the command line for the compiler to indicate the source code should be down converted.

By providing such a capability, library providers may maintain a single source base, such as, e.g., a Java 10 environment, while still support multiple environments. It is noted that while the above examples are directed towards environments that have different versions of a programming language, in other embodiments, the environments may be targeted at different hardware configurations, different versions of the operating systems, different performance requirements, and the like.

In some cases, an environment may allow for a new feature that is not available in other environments. A projection for the new feature may be possible by replacing the source code for the new feature with other source code compatible with the target environment, which performs a similar feature. It is noted, that when such a replacement is made, the performance of the replacement code may be less than that of the original code. An example of a new feature is depicted in Example 3.

Example 3

Lambda Expressions

```
Java 8:
Predicate<String> startsWithAbc = (String s) ->
s.startsWith("abc");
    where Predicate<T> is an interface that has one
method:
        interface Predicate<T> {
            boolean test(T input);
        }
Java 7:
    Predicate<String> startsWithAbc =
        new Predicate<String>( ) {
            public boolean test (String input) {
                return input.startsWith("abc");
            }
        }
    }
```

Lambda expressions were added into the Java 8 environment. A lambda expression is an anonymous method and the language allows a conversion of a lambda expression to an interface that has a single abstract method. As shown in Example 3, the lambda expression available in Java 8 may be substitute with an anonymous class in Java 7. With such a projection, code for a Java 8 environment may be compiled for a Java 7 environment.

As described above, different environments may have different versions of a programming platform. Alternatively, or additionally, different environments may have different versions of an included software library. In such cases, one version of a library may include a feature that is not available in a proceeding version of the library. An example of such a feature is depicted in Example 4.

Example 4

Library Idioms

```
Java 8:
List<Book> books = map.computeIfAbsent(author,
    a -> new ArrayList<>( ));
        books.add(book);
Java 7:
List<Book> books = map.get(author);
    if (books == null) {
        books = new ArrayList<>( );
        map.put(author, books);
    }
    books.add(book);
```

Library idioms were added to in Java 8 and provide a simplified method for fetching a mapping from a map (also referred to as a "dictionary" or "hash"), and in response to determining the desired mapping is not present, computing a new value and adding it to the map. In Example 4, adding an author/book pair to an existing map may be accomplished in Java 8 by employing the computeIfAbsent method included in the Java 8 library.

If the target environment, however, is Java 7, then the computeIfAbsent method is unavailable. Compiler 103 may replace the lines of code associated with adding the author/book pair with Java 7 equivalent code prior to generating the executable file. It is noted that the equivalent Java 7 function includes a larger number of lines of code and may not run as efficiently as the Java 8 code.

Figure 5:
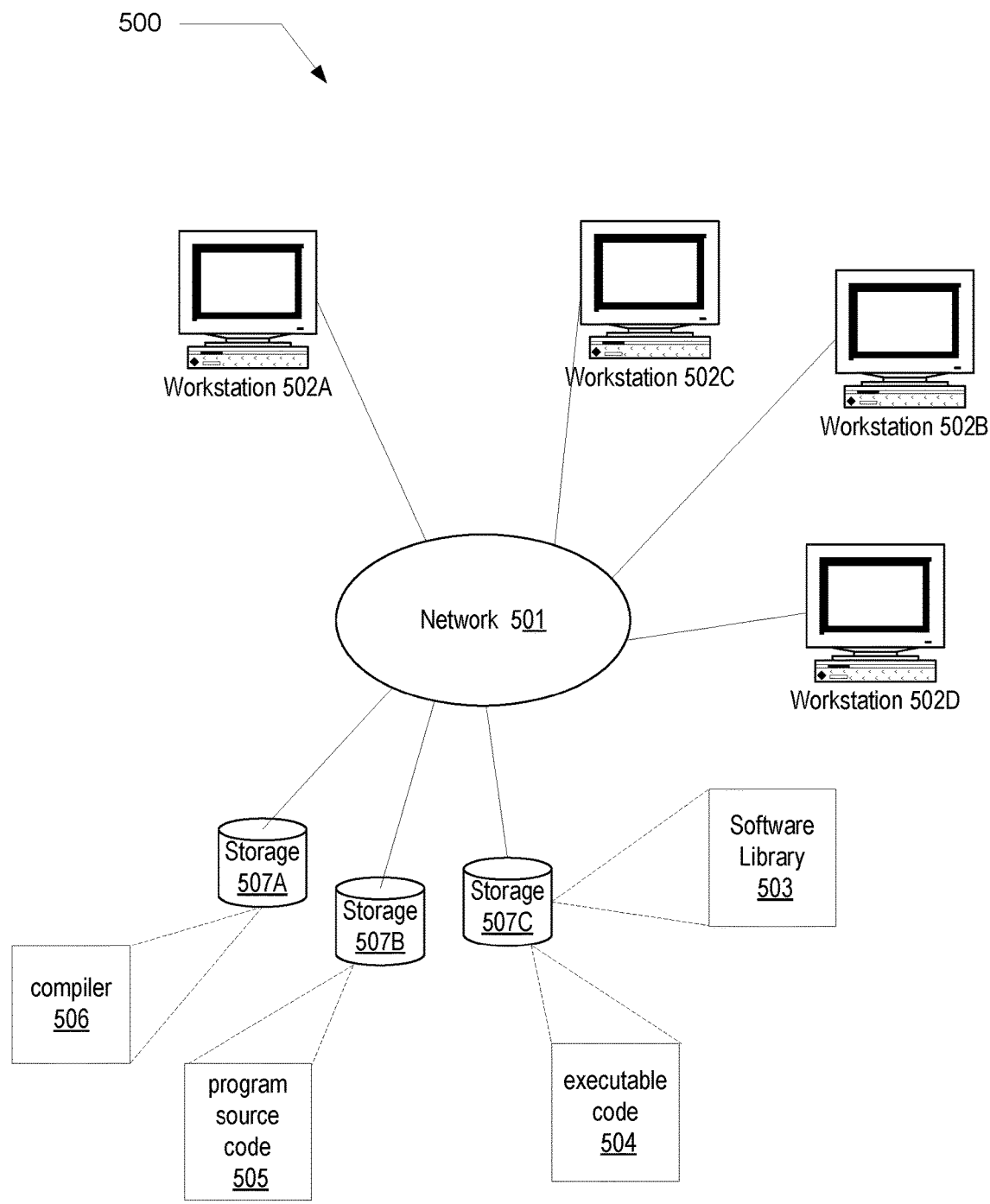
FIG. 5 is a block diagram of one embodiment of a computer system including a compiler.

Another example of a feature that was added in a particular version of a programming language is illustrated in FIG. 5. A resource is an object that must be closed after a program is finished using it. As shown in FIG. 5, prior to Java 7, a finally statement was used to ensure that resource is closed whether or not the try statement completes normally or not.

In Java 7, the try statement was enhanced to ensure that the resource is closed at the end of the statement (commonly referred to as "try-with-resources"). Program source code that takes advantage of the try-with-resources statement may be directly compiled into a Java 7 environment. If, however, a user needs to compile such program source code for another environment in which the try-with-resources is not available, a compiler, such as, e.g., compiler 103, may translate the program source code and replace the try-with-resources code with code using the older try and finally statements.

Example 5

Try-with-Resources

```
Java 6:
static String
readFirstLineFromFileWithFinallyBlock(String
path)
throws IOException {
    BufferedReader br = new BufferedReader (new
FileReader(path));
    try {
        return br.readLine( );
    } finally {
        if (br != null) br.close( );
    }
}
Java 7:
static String readFirstLineFromFile(String
path) throws IOException {
    try (BufferedReader br =
            new BufferedReader (new
FileReader(path))) {
        return br.readLine( );
    }
}
```

Figure 2:
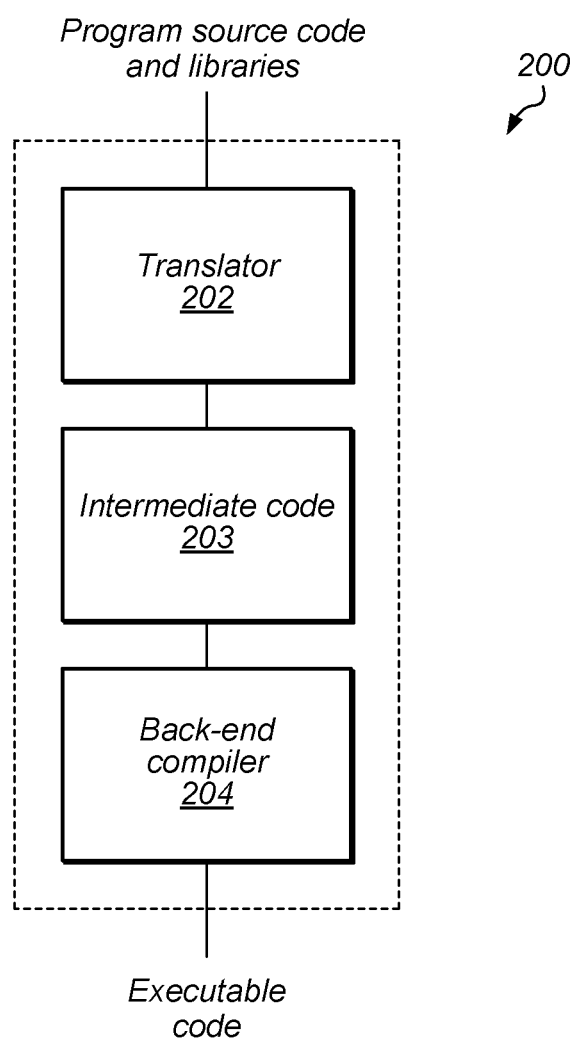
FIG. 2 illustrates a block diagram of an embodiment of a compiler.

Turning to FIG. 2, a block diagram depicting a compiler is illustrated. In various embodiments, compiler 200 may correspond to compiler 130 of the embodiment illustrated in FIG. 1. In the illustrated embodiment, compiler 200 includes Translator 202, Intermediate code 203, and Back-end compiler 204. It is noted that compiler 200 may be a collection of program instructions that are executed on a processor or processor core.

Translator 202 may, in various embodiments, correspond to a portion of the program instructions associated with compiler 200 which receive and preprocess program source code and any included software libraries. As described above, Translator 202 may translate source constructs included in the received program source code that use particular features unavailable in the target environment into modified versions of the source constructs. The modified versions of the source constructs may use different features that are compatible with the target environment. As used and described herein, a source construct may include one or more statements of expressions included in source code. The selection of the target environment may be supplied by a user as described above in regard to FIG. 1.

During operation, Translator 202 analyzes the received program source code and associated libraries. When a portion of the source code is encountered which uses a feature that is not available in the target environment but has a projection into the target environment, Translator 202 may then create a modified version of the portion of the source code that is compatible with the target platform. The modified version of the portion of the source code may then be added to Intermediate code 203, along with any source code not requiring modification. In creating the modified portion of the source code, Translator 202 may replace one or more statements or expressions of the received program source code and libraries, with other statements or expressions that perform the same function, but are compatible with the target platform.

As described above, Intermediate code 203 may include modified versions of source code along with other unmodified code from the receive program source code and libraries. Intermediate code 203 may be converted to executable code by Back-end compiler 204. As with Translator 202, Back-end compiler 204 may correspond to a portion of the program instructions included in compiler 200. In various embodiments, Back-end compiler 204 may generate a binary file consisting of commands available in an Instruction Set Architecture of a particular processor or processor core.

By preprocessing the received program source code and libraries prior to conversion to executable code, semantics and other information lost during compilation may be preserved. As a result, simplified debug of a program compiled for a target platform using source code translation may be possible.

Although the function of compiler 200 is described in the context of static compilation, it is noted that, in other embodiments, the translation of source code for a target environment may also be applied for use with virtual machines running on a multi-processor or multi-processor core system.

It is noted that the embodiment illustrated in FIG. 2 is merely an example. In other embodiments, different functional blocks and different arrangements of functional blocks may be employed.

Figure 3:
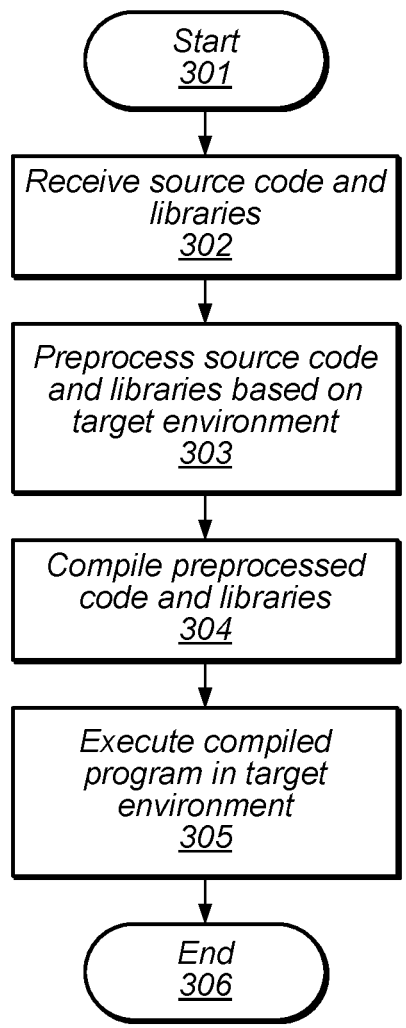
FIG. 3 illustrates a flow diagram depicting an embodiment of a method for compiling source code.

A flow diagram depicting an embodiment of a method for compiling a software program is illustrated in FIG. 3. Referring collectively to FIG. 1 and the flow diagram of FIG. 3, the method begins in block 301.

Compiler 103 may then receive software libraries 101 and program source code 102 (block 302). In various embodiments, software libraries 101 and program source code 102 may be written in a high-level language such as, Java™, for example. Each of software libraries 101 and program source code 102 may include portions of source code that use one more features, such as, e.g., 106a and 106b, which may have different implementations for different target environments.

Compiler 103 may then preprocess program source code 102 and software libraries 101 (block 103). The preprocessing may be dependent upon a target environment selection. For example, in the embodiment illustrated in FIG. 1, executable code 104 is targeted for execution in environment 105. Environment 105 may include any a specific version of a programming language, a specific hardware or operating system version, or particular performance goals, or any suitable combination thereof. As described below in more detail, compiler 103 may translate portions of the source code that use one or more features, such as, e.g., features 106a-b, included in software libraries 101 and program source code 102, to be compatible with the target environment.

Once program source code 102 and software libraries 101 have been preprocessed, compiler 103 may complete the compilation process to generate executable code 104 (block 304). As noted above, executable code 104 will be compatible with environment 105 with no further translation of the code. Executable code 104 may then be executed in environment 105 (block 305). The method may then conclude in block 306.

It is noted that the method depicted in FIG. 3 is merely an example. In other embodiments, different operations and different orders of operations may be employed.

Figure 4:
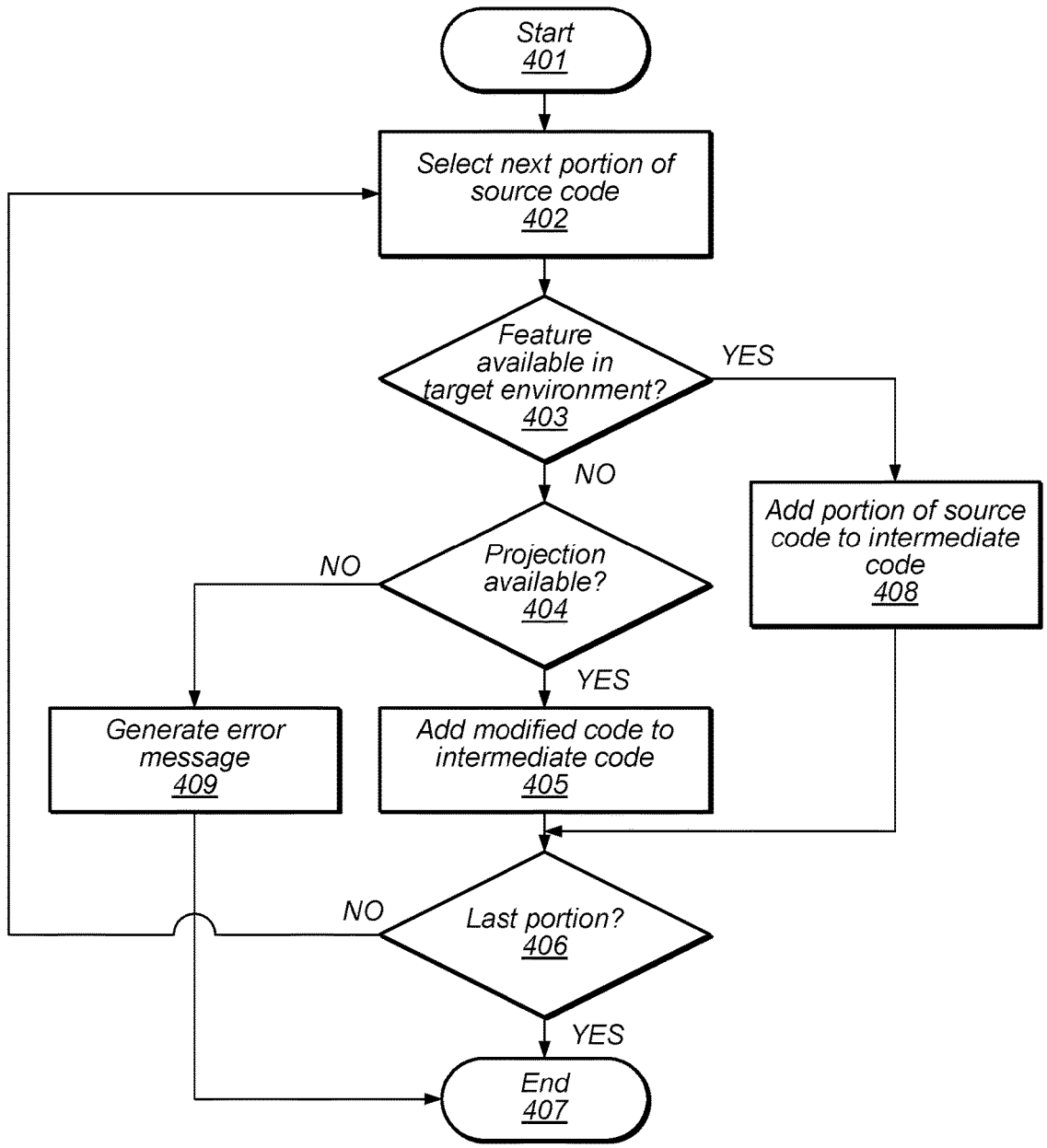
FIG. 4 illustrates a flow diagram depicting an embodiment of a method for preprocessing source code as part of a compilation process.

Turning to FIG. 4, an embodiment of a method for preprocessing program source code and software libraries is depicted in the illustrated flow diagram. In various embodiments, the method illustrated in the flow diagram of FIG. 4 may correspond to the operation performed in block 303 of the flow diagram depicted in FIG. 3. Referring collectively to FIG. 1, FIG. 2, and the flow diagram of FIG. 4, the method begins in block 401.

Compiler 103 may then select a portion of the source code of either software library 101 or program source code 102 (block 402), which uses a feature of a target environment. The method may then depend on if the feature used by the selected portion of the source code is available in the target environment (block 405). In some embodiments, translator 202 may check the used feature against a list of features available in the target environment. For example, translator 202 may determine if the used feature is available in a particular version of the software included in the target environment.

If the used feature is available in the target environment, then the portion of the source code is added to intermediate code 203 (block 408). The method may then continue from block 406 as described below. Alternatively, if the used feature is not supported in the target environment, then the method may then depend on if a projection of the used feature into the target environment is available (block 404).

If a projection into the target environment is not available, an error message may be generated (block 409), and the method may end in block 407. If, however, a projection into the target environment is available for the used feature, then a translated version of the portion of the source code is added into intermediate code 203 (block 405). The method may then depend on if there are further portions of the source code using various features remaining in program source code 102 and software libraries 101 (block 406). If there are additional portions remaining in program source code 102 and software libraries 101, then the method may continue from block 402 as described above. Alternatively, if the currently selected portion of the source code is the last portion of source code to process, then the method may conclude in block 407.

The embodiment of the method illustrated in FIG. 4 is merely an example. In other embodiments, different operations and different arrangements of operations are possible and contemplated.

Turning to FIG. 5, a block diagram of one embodiment of a computer system including an integrated circuit design tool. The computer system 500 includes a plurality of workstations designated 502A through 502D. The workstations are coupled together through a network 501 and to a plurality of storages designated 507A through 507C. In one embodiment, each of workstations 502A-502D may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 507A-507C may be representative of any type of mass storage device such as hard disk systems, optical media drives, tape drives, ram disk storage, and the like. As such, program instructions comprising the design tools such as a circuit simulation tool may be stored within any of storages 507A-507C and loaded into the local system memory of any of the workstations during execution. As an example, as shown in FIG. 5, compiler 506 is shown stored within storage 507A, while program source code 505 is stored within storage 507B. Further, software library 503 is stored within storage %07C. In one embodiment, compiler 506, executed on any of workstations 502A-D, may compile program source code 505. During compilation, compiler 506 may read software library 503 from storage 507C and generate executable code 504, which may be stored in storage 507C. In various embodiments, executable code 504 may be executed by any of workstations 502A-D.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-accessible storage medium having program instructions stored therein that, in response to execution by a computer system, causes the computer system to perform operations including:
    receiving source code for a program written for a user-selected source environment that is compatible with software features included in the source code, wherein the source code is written in a first version of a programming language;
    accessing a list of software features that are available in a target environment that is indicated for the source code, wherein the target environment specifies:
        a particular version of an operating system on which a compiled version of the program will be executed, and
        a second version of the programming language that is a prior version of the programming language than the first version;
    in response to determining that a first software feature of one or more software features included in the source code is unavailable in the target environment:
        identifying a portion of the source code that uses the first software feature that is unavailable in the target environment, wherein the identifying is performed prior to executing and compiling the portion of the source code;
        translating the portion of the source code to generate a modified version of the portion of the source code in response to determining that a projection of the first software feature into the target environment is available, wherein the modified version of the portion of the source code is compatible with the particular version of the operating system; and
        generating new source code for the program that is based on the modified version of the portion of the source code.

2. The non-transitory computer-accessible storage medium of claim 1, wherein the operations further include compiling the new source code.

3. The non-transitory computer-accessible storage medium of claim 1, wherein the operations further include selecting the target environment in response to user input.

4. A method, comprising:
- receiving source code for a program written for a user-selected source environment that is compatible with software features included in the source code, wherein the source code is written in a first version of a programming language;
- accessing a list of software features that are available in a target environment that is indicated for the source code, wherein the target environment specifies:
  - a particular version of an operating system on which a compiled version of the program will be executed, and
  - a second version of the programming language that is a prior version of the programming language than the first version;
- in response to determining that a first software feature of one or more software features included in the source code is unavailable in the target environment:
  - identifying a portion of the source code that uses the first software feature that is unavailable in the target environment, wherein the identifying is performed prior to executing and compiling the portion of the source code;
  - translating the portion of the source code to generate a modified version of the portion of the source code in response to determining that a projection of the first software feature into the target environment is available, wherein the modified version of the portion of the source code is compatible with the particular version of the operating system; and
  - generating new source code for the program that is based on the modified version of the portion of the source code; and
- wherein the method is performed by one or more computing devices.

5. The method of claim 4, further comprising compiling the new source code.

6. The method of claim 4, wherein translating the portion of the source code includes replacing a first source construct included in the source code with a second source construct, wherein the second source construct uses a second feature available in the target environment.

7. The method of claim 4, further comprising selecting the target environment in response to user input.

8. A system comprising:
- one or more memories configured to store instructions, and
- one or more processors configured to receive instructions from the one or more memories and execute the instructions to cause the system to perform operations comprising:
  - receiving, via user input:
    - source code for a program written for a user-selected source environment that is compatible with software features included in the source code, wherein the source code is written in a first version of a programming language; and
    - a target environment that specifies:
      - a particular version of an operating system on which a compiled version of the program will be executed, and
      - a second version of the programming language that is a prior version of the programming language than the first version;
  - in response to receiving the source code and the target environment, and without further input from a user:
    - accessing a list of software features that are available in the target environment that is indicated for the source code;
    - in response to determining that a first software feature of one or more software features included in the source code is unavailable in the target environment:
      - identifying a portion of the source code that uses the first software feature that is unavailable in the target environment, wherein the identifying is performed prior to executing and compiling the portion of the source code;
      - translating the portion of the source code to generate a modified version of the portion of the source code in response to determining that a projection of the first software feature into the target environment is available, wherein the modified version of the portion of the source code is compatible with the particular version of the operating system; and
      - generating new source code for the program that is based on the modified version of the portion of the source code.

9. The system of claim 8, wherein the operations further include compiling the new source code.

10. The system of claim 8, wherein translating the portion of the source code includes replacing a first source construct included in the source code with a second source construct, wherein the second source construct is available in the target environment.

* * * * *